(12) United States Patent
Kim et al.

(10) Patent No.: US 11,880,593 B2
(45) Date of Patent: Jan. 23, 2024

(54) HOST, OPERATING METHOD OF HOST AND STORAGE SYSTEM

(71) Applicant: SAMSUNG ELECTRONICS CO., LTD., Suwon-si (KR)

(72) Inventors: Jin-Soo Kim, Seoul (KR); Jaehoon Shim, Seoul (KR); Carl Duffy, Seoul (KR)

(73) Assignees: SAMSUNG ELECTRONICS CO., LTD., Suwon-si (KR); SEOUL NATIONAL UNIVERSITY R&DB FOUNDATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/817,714

(22) Filed: Aug. 5, 2022

(65) Prior Publication Data
US 2023/0050262 A1 Feb. 16, 2023

(30) Foreign Application Priority Data

Aug. 13, 2021 (KR) .......................... 10-2021-0107624
Mar. 16, 2022 (KR) .......................... 10-2022-0032949

(51) Int. Cl.
G06F 3/06 (2006.01)
(52) U.S. Cl.
CPC .......... *G06F 3/0656* (2013.01); *G06F 3/0625* (2013.01); *G06F 3/0679* (2013.01)
(58) Field of Classification Search
CPC ..... G06F 3/0656; G06F 3/0625; G06F 3/0679
See application file for complete search history.

(56) References Cited

U.S. PATENT DOCUMENTS 9,454,550 B2    9/2016 Choi et al.
9,952,765 B2    4/2018 Krishnamachari et al.
(Continued)

FOREIGN PATENT DOCUMENTS

KR    10-1341507    12/2013
KR    10-1438667    9/2014
KR    10-1575246    12/2015

OTHER PUBLICATIONS

Rodeh, "B-trees, Shadowing, and Clones", ACM Transactions on Storage, vol. 3, No. 4, Article 15, Publication date: Feb. 2008, pp. 15:1-15:27.

(Continued)

*Primary Examiner* — Jae U Yu
(74) *Attorney, Agent, or Firm* — F. CHAU & ASSOCIATES, LLC

(57) ABSTRACT

A host includes: an index tree storing an index including information for identifying a versioning key; and an index update buffer storing a write key included in data subject to a write request and the versioning key corresponding to the write key. When a preset update condition is satisfied, the host transfers the versioning key stored in the index update buffer to the index tree, and when the index update buffer requires recovery, the host designates a recovery section of memory of the storage device including data corresponding to the versioning key which has not been updated to the index tree, to be read by a plurality of threads, reads data included in the recovery section from the storage device through the plurality of threads, and inserts the read data into the index update buffer to recover the index update buffer.

20 Claims, 13 Drawing Sheets

(56) References Cited

U.S. PATENT DOCUMENTS

| | | |
|---|---|---|
| 10,268,502 B2 | 4/2019 | Doshi et al. |
| 10,592,530 B2 | 3/2020 | Wang et al. |
| 10,761,946 B2 | 9/2020 | Bensberg et al. |
| 10,956,050 B2 | 3/2021 | Tudor et al. |
| 2003/0058875 A1* | 3/2003 | Arndt .................. H04L 49/901 370/328 |
| 2015/0120774 A1 | 4/2015 | Park et al. |
| 2021/0019237 A1 | 1/2021 | Karr et al. |

OTHER PUBLICATIONS

Kim, et al., "LSB-Tree: a log-structured B-Tree index structure for NAND flash SSDs", Design Automation for Embedded Systems, vol. 191 Issue 1-2, Mar. 2015, pp. 77-100.

Ahn, et al., "Jungle: Towards Dynamically Adjustable Key-Value Store by Combining LSM-Tree and Copy-On-Write B+-Tree", 2019, 8 pages.

Rodeh, et al., "BTRFS: The Linux B-Tree Filesystem", ACM Transactions on Storage, vol. 9, No. 3, Article 9, Publication date: Aug. 2013, pp. 9:1-9:31.

Shim, et al. "LB2-Tree A Index Structure Specialized for Key-Value SSDs" Seoul National University, 43 pages, with English Abstract.

* cited by examiner

| INDEX UPDATE BUFFER |
|---|
| {D5, CMT#4 DATA1} |
| {D6, CMT#4 DATA2} |
| {D2', CMT#4 DATA3} |
| {D6', CMT#5 DATA1} |
| ⋮ |

HOST, OPERATING METHOD OF HOST AND STORAGE SYSTEM

CROSS-REFERENCE TO RELATED APPLICATIONS

This application is based on and claims priority under 35 U.S.C. § 119 to Korean Patent Application Nos. 10-2021-0107624, filed on Aug. 13, 2021, and 10-2022-0032949, filed on Mar. 16, 2022 in the Korean Intellectual Property Office, the disclosures of which are incorporated by reference herein in their entireties.

TECHNICAL FIELD

This disclosure relates generally to storage systems and hosts thereof, and more particularly to a host that communicates with a storage device processing data by using a key-value pair.

DISCUSSION OF RELATED ART

Storage devices may be classified as having block storage, file storage, or object storage architectures. Block storage may manage data based on a physical location, and file storage may manage data based on a logical sequence. Object storage may manage data based on a unique identifier. Block storage and file storage may be useful for large amounts of text data whereas object storage may be an efficient alternative in the case of huge volumes of unstructured data such as sound data and image data. A key-value storage, which stores data based on a key-value pair, may be used as object storage.

The key-value storage may perform a write operation or a read operation based on a command received from a host. The host may transmit a read command including a key to the key-value storage, and the key-value storage may transmit a value to the host in response to the read command. The host may obtain a key for a value to be read though an index tree which stores a key through an index. The host may update the index tree at each time multiple units of data are written, instead of updating the index tree each time a single new data unit is written to the key-value storage. In this case, when the power supply to the host is suddenly cut off, data which has not been updated to the index tree needs to be recovered.

SUMMARY

Embodiments of the inventive concept provide a host capable of more quickly recovering data which has not been updated to an index tree.

According to an aspect of the inventive concept, there is provided a host for communicating with a storage device that stores data in key-value pairs. The host includes: a processor; a memory including an index tree that stores an index including a versioning key used to read data stored in the storage device; and an index update buffer that stores a write key included in data subject to a write request and the versioning key corresponding to the write key. The processor is configured to: when a preset update condition is satisfied, transfer the versioning key stored in the index update buffer to the index tree, and when the index update buffer requires recovery, designate a recovery section of memory in the storage device to be read by a plurality of threads, read data included in the recovery section from the storage device through the plurality of threads, and insert the read data into the index update buffer to recover the index update buffer.

According to another aspect of the inventive concept, there is provided an operating method of a host communicating with a storage device that stores data in key-value pairs, and including an index tree storing an index including a versioning key used to read data stored in the storage device, and an index update buffer storing a write key included in data subject to a write request and the versioning key corresponding to the write key, the operating method including: identifying, by the host, a recovery section including data corresponding to the versioning key which has not updated to the index tree; designating, by the host, portions of the recovery section to be read by a plurality of threads; reading, by the host, data included in the recovery section from the storage device through the plurality of threads; and inserting, by the host, the read data into the index update buffer to recover the index update buffer.

According to another aspect of the inventive concept, there is provided a storage system including the above-described host and storage device.

BRIEF DESCRIPTION OF THE DRAWINGS

Embodiments of the inventive concept will be more clearly understood from the following detailed description taken in conjunction with the accompanying drawings in which:

FIG. 7 is a diagram of an index update buffer of a host according to an embodiment;

DETAILED DESCRIPTION OF EMBODIMENTS

Hereinafter, embodiments of the inventive concept will be described in detail with reference to the accompanying drawings.

Figure 1:
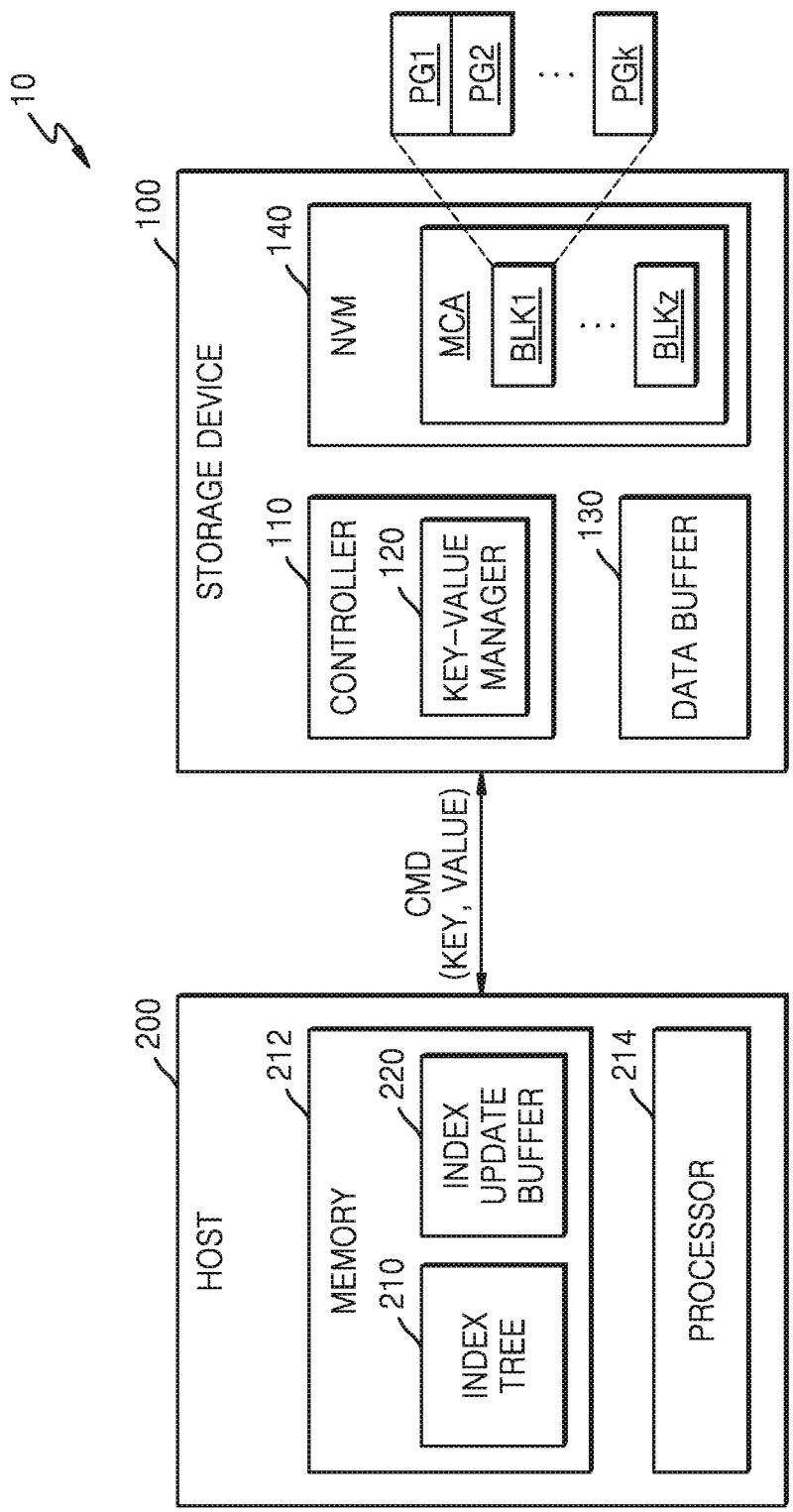
FIG. 1 is a block diagram of a storage system according to an embodiment.

FIG. 1 is a block diagram of a storage system, 10, according to an embodiment. The storage system 10 may include a storage device 100 and a host 200.

Some examples of the storage system 10 include a storage system of a personal computer (PC), a data server, a network-attached storage, an Internet of Things (IoT) device, or a portable electronic device. The portable electronic device may be any one of a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc.

In some embodiments, the storage device 100 is an internal memory embedded in an electronic device. For example, the storage device 100 may be a solid state drive (SSD), an embedded universal flash storage (UFS) memory device, or an embedded multi-media card (eMMC). In other embodiments, the storage device 100 is an external memory removable from an electronic device. For example, the storage device 100 may be a UFS memory card, a compact flash (CF), a secure digital (SD), a micro secure digital (micro-SD), a mini secure digital (mini-SD), an extreme digital (xD) or a memory stick.

The storage device 100 may be a key-value storage device, e.g., a key-value SSD, and may also be called a "key-value store". A key-value storage device may refer to a device processing data quickly and simply by using a key-value pair. Here, the "key-value pair" may be a pair consisting of a unique key and a value, where the value is data corresponding to the key. The key-value pair may be referred to as a "tuple" or a "key-value tuple." Moreover, the key-value pair may mean a data storage paradigm designed for storing and search management of an associative array, which may be a data structure referred to as a dictionary, a hash, etc. In the key-value pair, the key may be expressed as a string such as a file name, a uniform resource identifier (URI), a field, or a hash, and the value may be any of various types of data such as an image, a user preference file, or a document. Here, the size of the key and the value is variable, and for example, the size of the value may be changed according to data included in the value.

Hereinafter, embodiments are described focusing on a case where the storage device 100 is a key-value storage device. Some other examples of the storage device 100 include an object cash system and an object storage system which manage data on an object basis. Accordingly, the storage device 100 may manage data on an object basis by a method other than a key-value pair method.

The storage device 100 may include a controller 110, a data buffer 130, and a non-volatile memory (NVM) 140.

The controller 110 may control the NVM 140 to write a value to the NVM 140 in response to a write command from the host 200, or to read a value stored in the NVM 140 in response to a read command from the host 200.

The controller 110 may include a key-value manager 120. The key-value manager 120 may receive a key-value pair (KEY and VALUE) included in or following a key-value command CMD and separate a key and a value included in the key-value pair. The key-value manager 120 may extract a plurality of keys included in a plurality of key-value pairs, respectively, and store the plurality of keys in the data buffer 130. The key-value manager 120 may extract a plurality of values included in a plurality of key-value pairs, respectively, and store the plurality of values in the data buffer 130.

When a certain number or a certain data amount of keys are stored in the data buffer 130, the key-value manager 120 may store the stored keys in the NVM 140 as a key stream. When a certain number or a certain data amount of values are stored in the data buffer 130, the key-value manager 120 may store the stored values in the NVM 140 as a value stream. Each of the value stream and the key stream may be stored in different areas of the NVM 140.

The data buffer 130 may include at least one memory device for storing the keys and the values, and in an embodiment, the data buffer 130 may include a volatile memory device such as a dynamic random access memory (DRAM) and a static random access memory (SRAM).

The NVM 140 may include a memory cell array MCA, and the memory cell array MCA may include memory blocks BLK1 to BLKz. The memory block BLK1 may include a plurality of pages PG1 to PGk. Here, each of z and k may be a positive integer, and may vary according to embodiments. For example, the memory block may be a memory region that can be erased as a unit, and the page may be a unit of writing and reading. In some embodiments, the memory cell array MCA may include a plurality of planes, a plurality of dies, or a plurality of chips. The NVM 140 may be or include a flash memory device, and for example, may be or include a NAND flash memory device. In other examples, the NVM 140 may be or include a resistive memory device such as a resistive RAM (ReRAM), a phase change RAM (PRAM), or a magnetic RAM (MRAM).

The key stream generated by using the keys and the value stream generated by using the values may be stored in different memory blocks BLK1 to BLKz, or may be stored in different pages PG1 to PGk of the same memory block (e.g., the memory block BLK1).

The host 200 may communicate with the storage device 100 through various interfaces. In an embodiment, the host 200 may be implemented as an application processor (AP) or a system-on-a-chip (SoC).

The host 200 may include a processor 214 that executes the operations performed by the host 200 as described herein. Hereafter, when the "host 200" is described as performing certain operations, the operations may be performed by the processor 214. The host 200 may also include a memory that stores an index tree 210 and an index update buffer 220. The memory 212 may include volatile memory, e.g., DRAM, and non-volatile memory. The non-volatile memory may store instructions read and executed by the processor 214 to implement the operations of the host 200. The volatile memory may store the index tree 210 and the index update buffer 220.

The host 200 may transmit the key-value command CMD to write data including the key-value pair, e.g., a write command or a "put command", to the storage device 100, and the storage device 100 may write a value to the NVM 140 in response to the key-value command CMD.

Moreover, the host 200 may transmit the key-value command CMD including a key, e.g., a read command or a "get command", to the storage device 100, and the storage device 100 may read a value corresponding to the key from the NVM 140 in response to the key-value command CMD.

In this regard, the host 200 may transmit the key-value command CMD to the storage device 100 based on a write request or a read request received from an external source through an interface, e.g., from a user, another electronic device, etc. The operations performed by the host 200 when receiving the write request or the read request are described below with reference to FIGS. 3 and 4.

The host 200 may store the index tree 210 and the index update buffer 220 in the memory 212. The index tree 210 may be a tree which enables searching for keys used to read data stored in the storage device 100 through an index. The index tree 210 may include information for identifying a key used to read data stored in the storage device 100. Accordingly, the host 200 may search for a key corresponding to a read request received from an external source through the index tree 210 and transmit a key-value command CMD generated based thereon to the storage device 100.

The index tree 210 may also be stored in the storage device 100 (e.g., in the NVM 140), and the host 200 may use the index tree 210 by loading the index tree 210 from the storage device 100 to the memory 212. The index tree 210 is described in more detail with reference to FIGS. 5 and 6. When the index tree 210 is stored in non-volatile memory of the memory 212, if there is a sudden power loss, the data in the non-volatile memory may be lost. However, since the index tree 210 is also stored in the storage device 100, the index tree 210 may be re-loaded from the storage device 100 subsequent to the power loss, such that operations involving the index tree 210 may resume.

The index update buffer 220 may temporarily store data included in a write request received from an external source. To this end, when the host 200 receives a write request from the external source, the host 200 may store the write request in the index update buffer 220, and when a preset update condition is satisfied, data (e.g., a key and a value) associated with the write request may be transferred to the index tree 210 to update the index tree 210.

The index update buffer 220 may not be stored in the storage device 100, and the host 200 may use the index update buffer 220 by temporarily storing the index update buffer 220 in the volatile memory of memory 212. The index update buffer 220 is described in more detail with reference to FIG. 7.

When the index update buffer 220 requires recovery to recover data previously stored therein, the host 200 may initiate a recovery process. The recovery process may identify a "recovery section" of memory within the storage device 100 storing data corresponding to a "versioning key" which was not transferred from the index update buffer 220 to the index tree 210. The recovery process may designate portions of the recovery section to be read by a plurality of threads executed by the processor 214, respectively. The processor 214 may read data included in the recovery section from the storage device 100 through the plurality of threads, and insert the read data into the index update buffer 220 to recover the index update buffer 220. The operation of recovering the index update buffer 220 by the host 200 is described in more detail with reference to FIG. 11.

Figure 2:
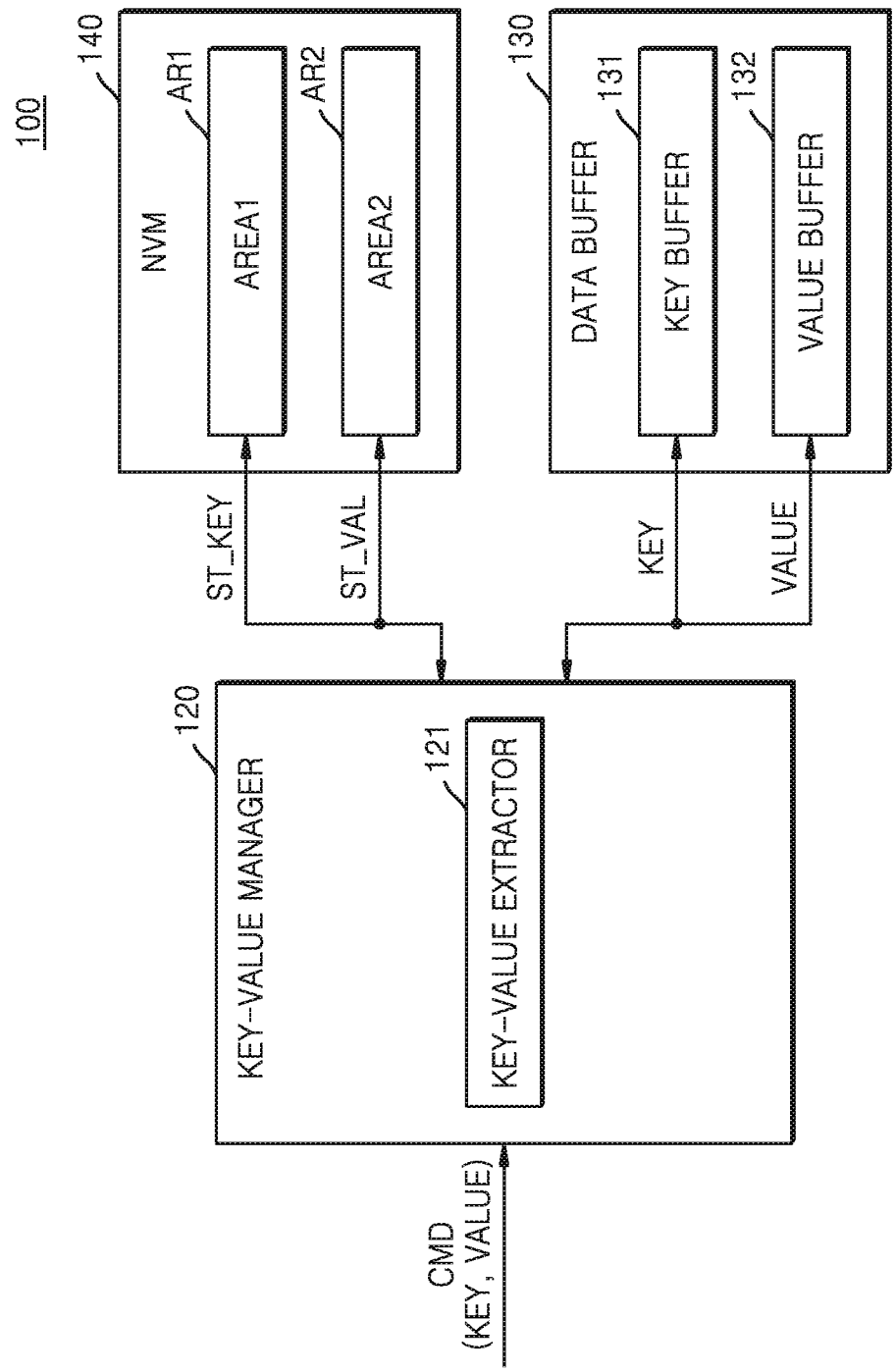
FIG. 2 is a block diagram of a storage device according to an embodiment.

FIG. 2 is a block diagram of a storage device according to an embodiment. the storage device 100 may include the key-value manager 120, the data buffer 130, and the NVM 140. The key-value manager 120 may include a key-value extractor 121.

The key-value extractor 121 may extract a key KEY and a value VALUE included in a key-value command CMD. The key may be the above-mentioned versioning key. The key-value extractor 121 may store the extracted key in a key buffer 131 of the data buffer 130, and store the extracted value in a value buffer 132 of the data buffer 130. In an embodiment, the key buffer 131 and the value buffer 132 may be separate memory devices. In another embodiment, the key buffer 131 and the value buffer 132 may include different areas of the data buffer 130.

In an embodiment, the key-value extractor 121 may manage a physical address of the key stored in the key buffer 131 by using a mapping table, where the mapping table may be generated as a hash table also storing a hashed key corresponding to the key as a mapping index for the key.

When a plurality of keys stored in the key buffer 131 reach or exceed a certain data amount, the key-value extractor 121 may generate a key stream ST_KEY based on the plurality of keys. In an embodiment, the key-value extractor 121 may generate the key stream ST_KEY by consecutively arranging the plurality of keys. In another embodiment, the key-value extractor 121 may generate the key stream ST_KEY by merging indexes for the plurality of keys and the values respectively corresponding to the plurality of keys. The key-value extractor 121 may store the generated key stream ST_KEY in a first area AR1 of the NVM 140.

In an embodiment, the key-value extractor 121 may manage a physical address of a stored key in the first area AR1 by using a key table, where the key table may be generated as a hash table also storing a hashed key corresponding to the key as a mapping index for the key.

When a plurality of values stored in the value buffer 132 reach or exceed a certain data amount, the key-value extractor 121 may generate a value stream ST_VAL based on the plurality of values. In an embodiment, the key-value extractor 121 may generate the value stream ST_VAL by consecutively arranging the plurality of values. The key-value extractor 121 may store the generated value stream ST_VAL in a second area AR2 of the NVM 140. In an embodiment, the key-value extractor 121 may manage a physical address of the stored value in the second area AR2 by using a value table.

Figure 3:
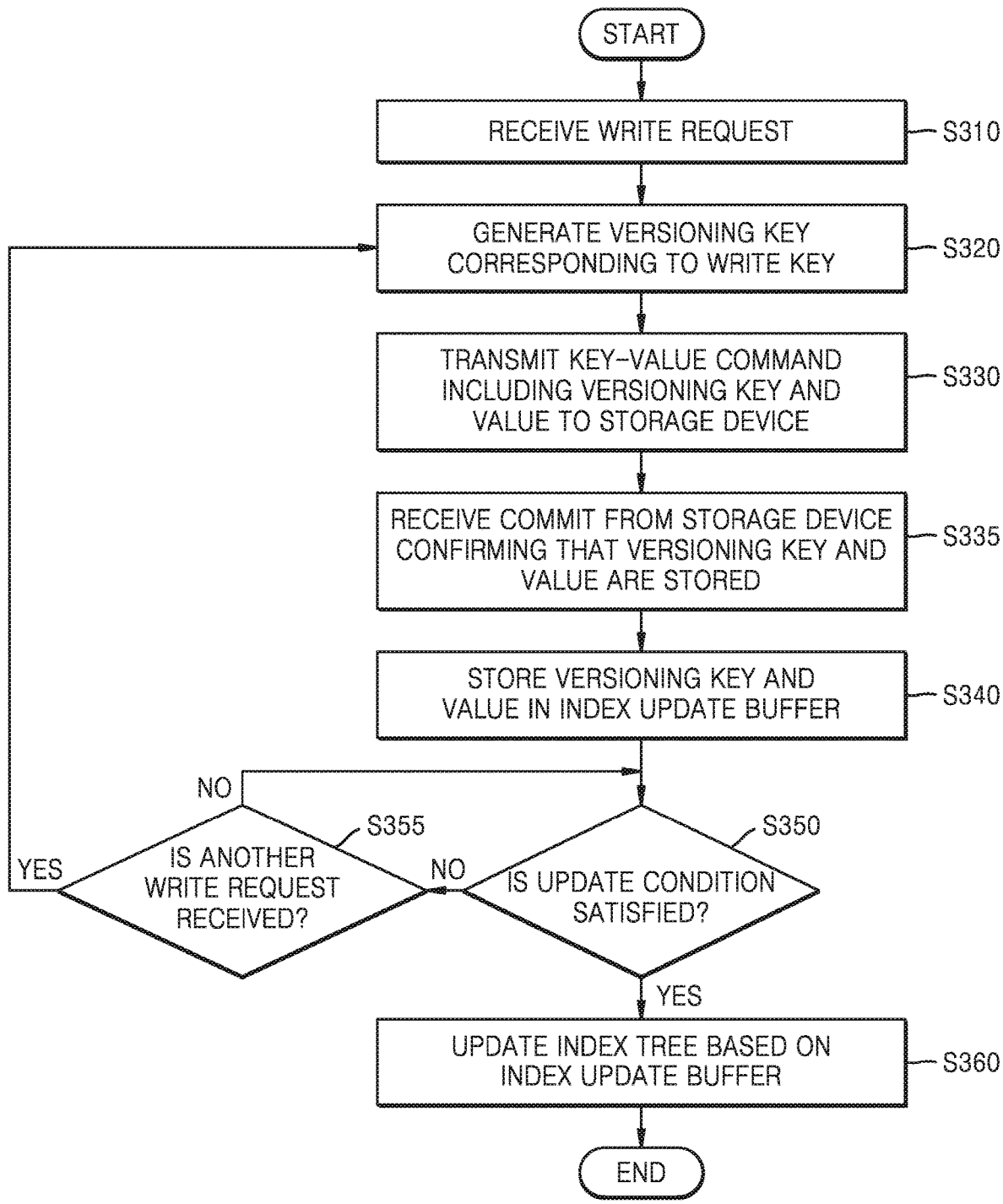
FIG. 3 is a flowchart of operations performed when a host receives a write request, according to an embodiment.

FIG. 3 is a flowchart of operations performed when a host receives a write request, according to an embodiment. The operations of FIG. 3 may be executed by the processor 214 of host 200.

With reference to FIG. 3, in operation S310, the host 200 may receive a write request. The write request may be a request to store data in the storage device 100 and may include a write key and a value. The value may be data to be written, and the write key may be a key corresponding to the value.

In operation S320, the host 200 may generate a versioning key corresponding to the write key. The versioning key may correspond to the value included in the write request, and may be mapped to a location in which the value is stored in the storage device 100.

In an embodiment, the host 200 may generate the versioning key based on a commit order of the storage device 100 and a data order in a commit. The commit may be a message from the storage device 100 to the host 200, confirming that the data is stored. The storage device 100 may transmit a commit to the host 200 per every preset cycle, and the host 200 may confirm that the data is stored in the storage device 100 by receiving the commit. (Note that the versioning key may include a commit number of the commit as described below, prior to the associated data being stored in the storage device 100, and, therefore, prior to the generation of the commit message. In other words, at the time the versioning key is generated by the host 200, the commit number in the versioning key indicates a future commit. Thus, the host 200 may send commands to the storage device 100 to manage the generation of the commits for consistency with the commit number in the versioning key.)

The commit order may be an order of commits transmitted from the storage device 100 to the host 200. The data order in a commit may be a storing order of data in the storage device 100 among the data confirmed to be stored by the same commit. As an example, the host 200 may generate a versioning key such as CMT #3 DATA 2 when the data to be written in response to the write request is confirmed to be stored in the storage device 100 by a third commit, and is secondly written data among the data confirmed to be stored by the third commit.

Because the write key may be a value generated based on a particular attribute value irrelevant to a storage location in the storage device 100, the host 200 may generate the versioning key to facilitate fast performance of the recovery operation on the index update buffer 220 described below.

In operation S330, the host 200 may transmit a key-value command CMD including the versioning key and the value corresponding to the versioning key to the storage device 100. Accordingly, data according to the write request may be written to the storage device 100.

In operation S335, the host 200 may receive a commit from the storage device 100 confirming that the versioning key and the value of the write request (e.g., the value of the key-value of the write request) associated with the versioning key are stored.

In operation S340, based on the commit received from the storage device 100, the host 200 may store the versioning key and the value corresponding to the versioning key in the index update buffer 220.

In operation S350, the host 200 may determine whether an update condition for updating the index tree 210 is satisfied. The update condition may be based on the data stored in the index update buffer 220. The update condition may be based on at least one of: the commit number of the storage device 100; whether a preset reference time has passed; and/or whether the host 200 has received a power off command. The commit number may refer to the number of commits received by the host 200 after the index update buffer 220 is updated. For example, when the number of commits received after the index tree 210 is updated reaches three, the host 200 may determine that the update condition is satisfied. When the reference time (e.g., one hour) has passed after the index tree 210 is updated, the host 200 may determine that the update condition is satisfied. When a power off command is received, the host 200 may determine that the update condition is satisfied.

When the host 200 determines that the update condition is not satisfied, then the flow proceeds to operation S355. If another write request is received in operation S355, the flow returns to operation S320. Otherwise, the method may repeat operation S350.

When the host 200 determines that the update condition is satisfied in operation S350, in operation S360, the host 200 may update the index tree 210 based on the index update buffer 220. To this end, the host 200 may transfer a versioning key stored in the index update buffer 220 to the index tree 210.

At this time, the host 200 may transfer all versioning keys stored in the index update buffer 220 to the index tree 210 simultaneously. Accordingly, operations required for updating the index tree 210 may be reduced.

Figure 4:
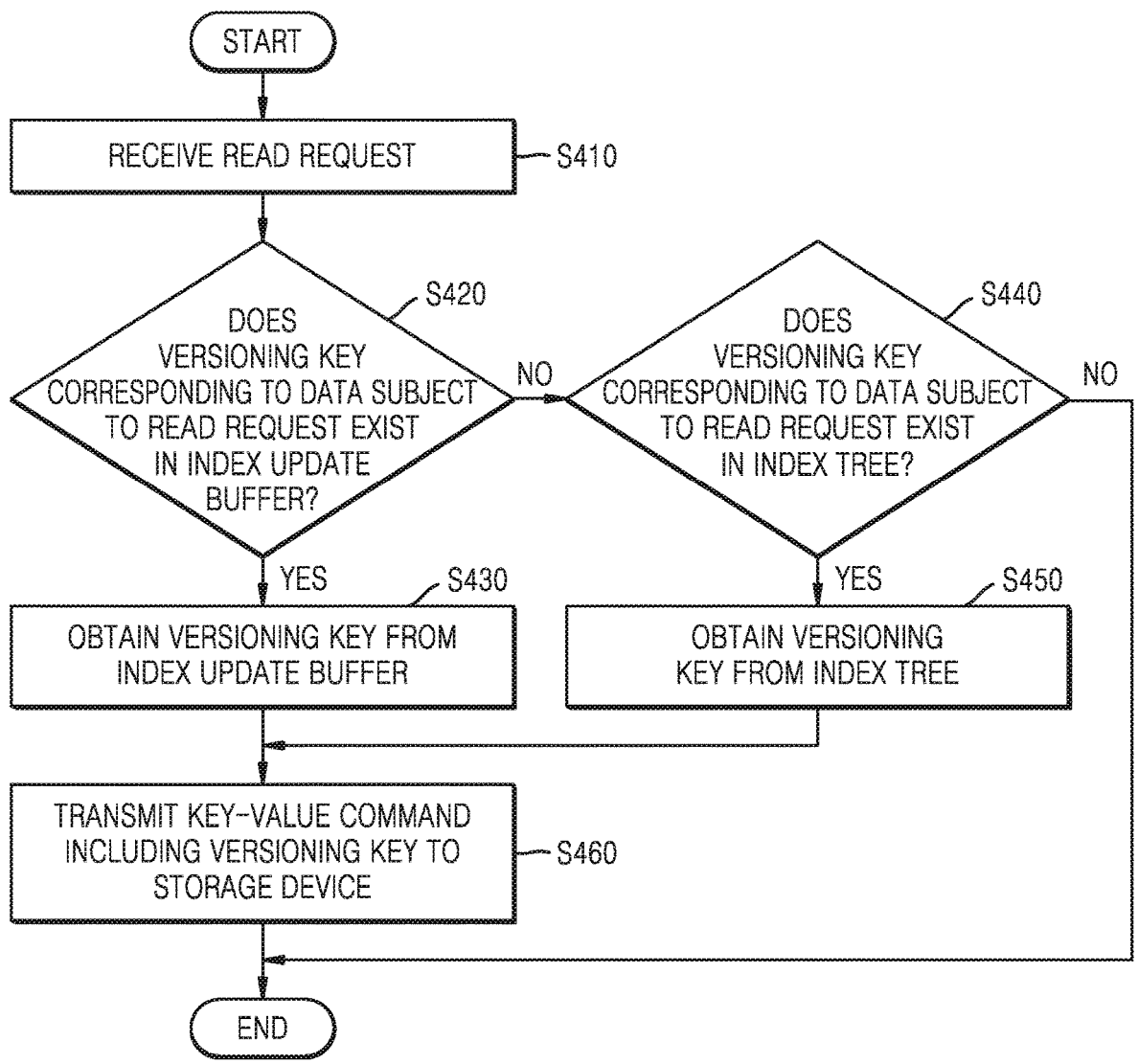
FIG. 4 is a flowchart of operations performed when a host receives a read request, according to an embodiment.

FIG. 4 is a flowchart of operations performed when a host receives a read request, according to an embodiment. With reference to FIG. 4, in operation S410, the host 200 may receive a read request. The read request may be a request to read data from the storage device 100.

In operation S420, the host 200 may determine whether a versioning key corresponding to data subject to the read request exists in the index update buffer 220. If the determination is YES, then in operation S430, the host 200 may obtain the versioning key from the index update buffer 220. Otherwise, in operation S440, the host 200 may determine whether the versioning key corresponding to the data subject to the read request exists in the index tree 210. If this determination is YES, in operation S450, the host 200 may obtain the versioning key from the index tree 210. If NO, this means that the data subject to the read request does not exist in the storage device 100, whereupon the operation may be terminated.

The host 200 may obtain the versioning key in operation S430 or operation S450, and transmit the key-value command CMD including the versioning key to the storage device 100. Accordingly, data according to the read request may be read from the storage device 100.

Figure 5:
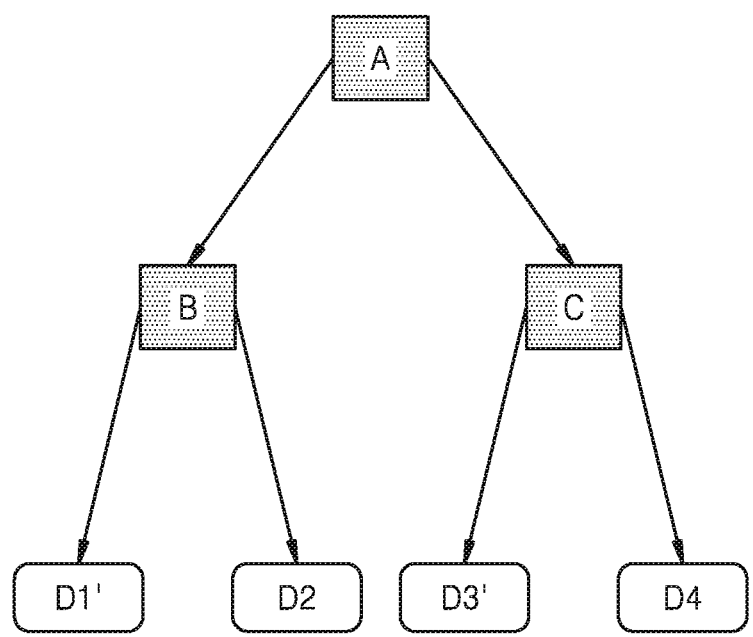
FIG. 5 is a diagram of an index tree of a host according to an embodiment.

FIG. 5 is a diagram illustrating an embodiment of an index tree, 210a, of a host. The index tree 210a may store an index including information for identifying a versioning key included in data stored in the storage device 100.

The index tree 210a may include a plurality of index nodes, e.g., an index node A, an index node B, and an index node C, and a plurality leaf nodes, e.g., a leaf node D1', a leaf node D2, a leaf node D3', and a leaf node D4. In this discussion, a node label (or a label for another type of data), followed by the prime notation (') may indicate that the label is a newly generated version of a previous node label (or the label for the other type of data). For example, the leaf node D1' may be a newly generated version of a previous leaf node D1.

The index node may store an index including information for identifying a versioning key corresponding to data to be read. Furthermore, the index node may route a request for the versioning key corresponding to the read request to another index node or a leaf node based on the index. For example, the index node A may route a request for a versioning key corresponding to a read request to the index node B or the index node C based on data to be read. The index node B may route the request for the versioning key corresponding to the read request to the leaf node D1' or the leaf node D2 based on the data to be read. The index node C may route the request for the versioning key corresponding to the read request to the leaf node D3' or the leaf node D4 based on the data to be read.

The leaf node may store the versioning key corresponding to the data to be read. Accordingly, the host 200 may obtain the versioning key corresponding to the data to be read by using the index tree 210a.

Figure 6:
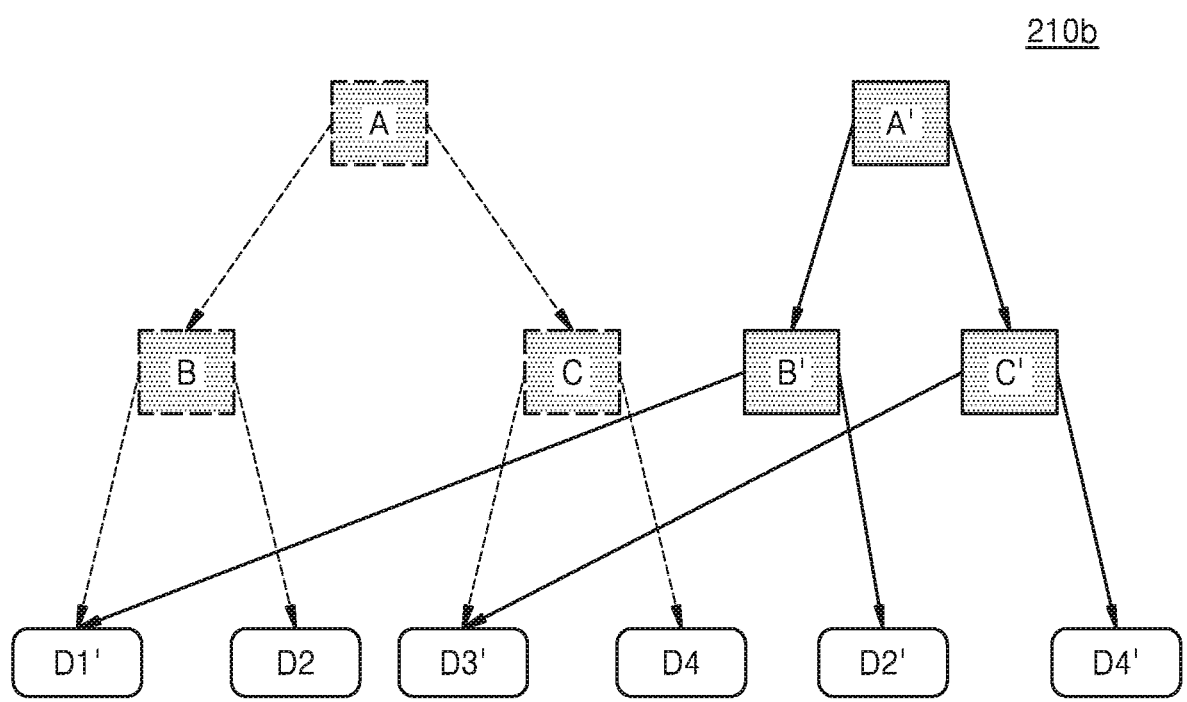
FIG. 6 is a diagram illustrating an updating method of an index tree of a host according to an embodiment.

FIG. 6 is a diagram illustrating a method for updating an index tree, 210b, of the host 200 according to an embodiment. The example of FIG. 6 illustrates changes in the index tree 210b when the leaf node D2 is updated to become a leaf node D2', and the leaf node D4 is updated to a leaf node D4'.

In an embodiment, the index tree 210b may be updated by an append-only method. The append-only method refers to a method of replacing an existing node with a newly generated node when a tree is updated, instead of overwriting an existing leaf node and an upper index node of the leaf node.

When the leaf node D2 is updated to become the leaf node D2', the host 200 may newly generate a node corresponding to the index node B and the index node A which are upper index nodes of the leaf node D2. When the leaf node D4 is updated to become the leaf node D4', the host 200 may newly generate a node corresponding to the index node C and the index node A which are upper index nodes of the leaf node D4.

Accordingly, the host 200 may generate an index node A', an index node B', and an index node C' which are new index nodes. Furthermore, the index node A' may be routably connected to the index node B' or the index node C', the index node B' may be routably connected to the leaf node D1' or the leaf node D2', and the index node C' may be routably connected to the leaf node D3' or the leaf node D4'.

FIG. 7 is a diagram of an index update buffer, 220*a*, of the host 200 according to an embodiment. The index update buffer 220*a* may store a write key included in data subject to a write request and a versioning key corresponding to the write key.

A first row of the index update buffer 220*a* may store D5 as data including a write key, and CMT #4 DATA 1 as a versioning key. A second row of the index update buffer 220*a* may store D6 as the data including the write key, and CMT #4 DATA 2 as the versioning key. When the data stored in the second row of the index update buffer 220*a* has the same commit order as the data stored in the first row of the index update buffer 220*a*, the data stored in the second row may have a versioning key with a data order increased by 1 in the commit.

A third row of the index update buffer 220*a* may store D2' as the data including the write key, and CMT #4 DATA 3 as the versioning key. (As noted above, the ' symbol succeeding a key indicates that the key is an updated version of a previous key.) When the data stored in the third row of the index update buffer 220*a* has the same commit order as the data stored in the first and second rows of the index update buffer 220*a*, the data stored in the third row may have a versioning key with a data order increased by 1 or 2 in the commit.

A fourth row of the index update buffer 220*a* may store D6' as the data including the write key, and CMT #5 DATA 1 as the versioning key. When the data stored in the fourth row of the index update buffer 220*a* has a commit order different than that of the data stored in the first to third rows of the index update buffer 220*a*, the data stored in the fourth row may have a versioning key with the commit order increased by 1 and the data order in the commit initialized to 1.

Figure 8:
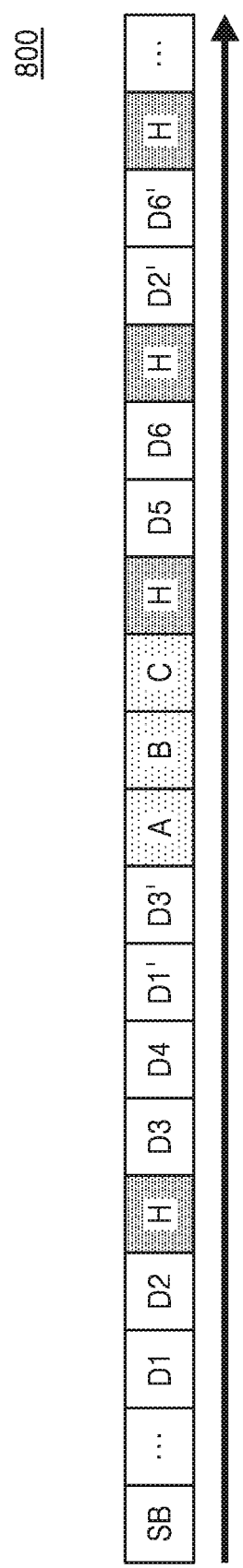
FIG. 8 is a diagram illustrating an example of a memory block stored in a storage device according to an embodiment.

FIG. 8 is a diagram illustrating an example of a memory block, 800, stored in the storage device 100 according to an embodiment. The memory block 800 may be composed of sequentially stored data in the order of writing. In the embodiment of FIG. 8, the order of writing of data may correspond to the direction of the arrow. The memory block may include a super block SB, one or more data blocks D1, D2, . . . , D6', one or more index blocks A, B, and C, and one or more header blocks H.

The super block SB may store a location of the header block H indicating a most recent commit order and a last commit order transferred to the index tree 210. The most recent commit order may refer to a commit order including or referencing a data block for which the most recent commit has been performed, and the last commit order transferred to the index tree 210 may refer to a commit order including or referencing a data block which has most recently been transferred to the index tree 210. Accordingly, the host 200 may identify a recovery section of the index update buffer as described below (also referred to as a recovery section of memory within the storage device 100) by accessing the header block.

The one or more data blocks D1, D2, . . . , D6' may store a versioning key and a value. The one or more index blocks A, B, and C may store an index of the index tree 210. The one or more header blocks H may store a "commit value" representing that a commit was performed.

In the example of FIG. 8, to generate the memory block 800, after data is stored in the data block D1 and the data block D2, a commit is performed, and a header block H is generated. Then, after data is stored in the data blocks D3, D4, D1', and D3', and an index of the index tree 210 is stored in the index block A, the index block B, and the index block C, a commit is performed and another header block H is generated. Afterwards, after data is stored in the data blocks D5 and D6, a commit is performed and a further header block H is generated. Finally, after data is stored in the data blocks D2' and D6', a commit is performed and yet another header block H is generated.

Figure 9:
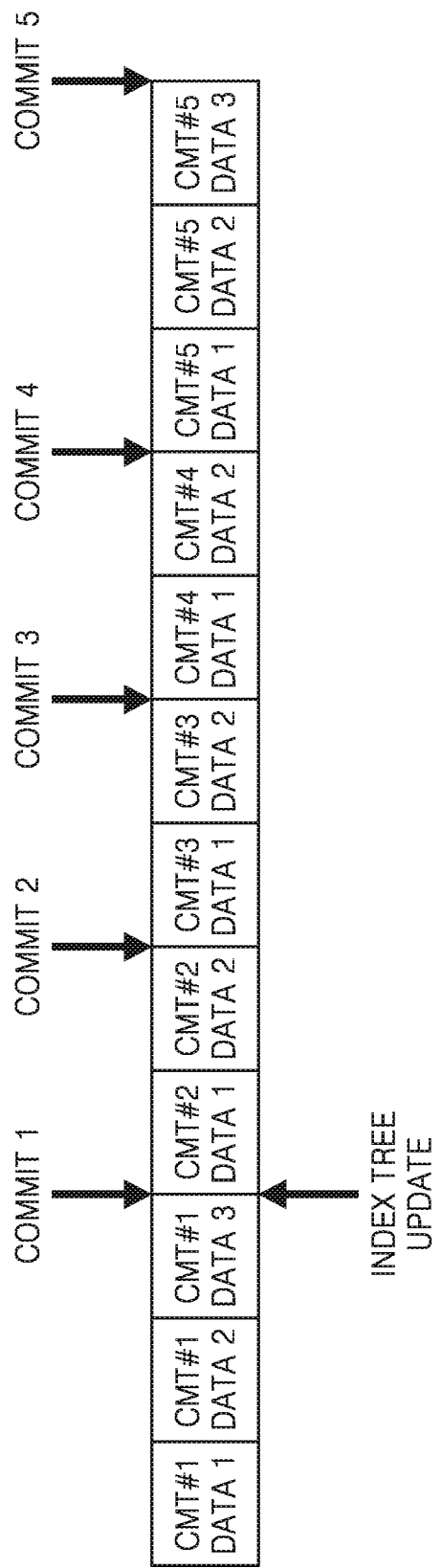
FIG. 9 is a diagram illustrating another example of a memory block stored in a storage device according to an embodiment.

FIG. 9 is a diagram illustrating another example of a memory block stored in the storage device 100, and commit operations associated with generating the same, according to an embodiment. For ease of explanation, the memory block is shown as a series of data blocks without the super block, the index block, and the header block, but these blocks may also be included in an interspersed arrangement similar to that of FIG. 8. Each of the data blocks is marked with a versioning key stored therein.

In the embodiment of FIG. 9, after data having the versioning keys CMT #1 DATA 1, CMT #1 DATA 2, and CMT #1 DATA 3 is stored, a first commit COMMIT 1 is performed. An update of the index tree 210 is performed simultaneously with the performance of the first commit COMMIT 1.

After data having the versioning keys CMT #2 DATA 1 and CMT #2 DATA 2 is stored, a second commit COMMIT 2 is performed. After data having the versioning keys CMT #3 DATA 1 and CMT #3 DATA 2 is stored, a third commit COMMIT 3 is performed. After data having the versioning keys CMT #4 DATA 1 and CMT #4 DATA 2 is stored, a fourth commit COMMIT 4 is performed. After data having the versioning keys CMT #5 DATA 1, CMT #5 DATA 2, and CMT #5 DATA 3 is stored, a fifth commit COMMIT 5 is performed. When the second commit COMMIT 2 to the fifth commit COMMIT 5 are performed, no update of the index tree 210 is performed.

Figure 10:
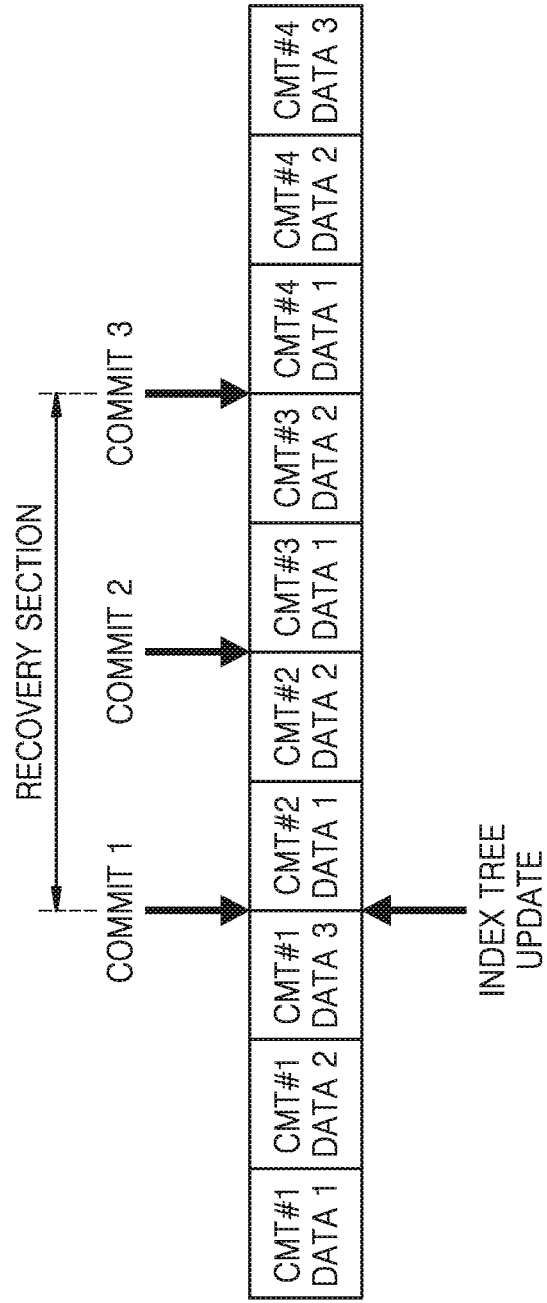
FIG. 10 is a diagram illustrating another example of a memory block stored in a storage device according to an embodiment.

FIG. 10 is a diagram illustrating another example of a memory block stored in a storage device according to an embodiment. This example only illustrates data blocks of the memory block stored in the storage device 100 excluding the super block, the index block, and the header block, which may all be included within the illustrated memory block, interspersed with the shown versioning keys in a similar manner as in FIG. 8. Each of the data blocks is marked with a versioning key stored therein.

The embodiment of FIG. 10 illustrates the same operations as in the embodiment of FIG. 9 up to the point of performing the third commit COMMIT 3. However, in the embodiment of FIG. 10, after the third commit COMMIT 3 is performed, data having the versioning key CMT #4 DATA 1, CMT #4 DATA 2, and CMT #4 DATA 3 is stored, and the fourth commit COMMIT 4 has not been performed yet. When the second commit COMMIT 2 and the third commit COMMIT 3 are performed, no update of the index tree 210 is performed.

Figure 11:
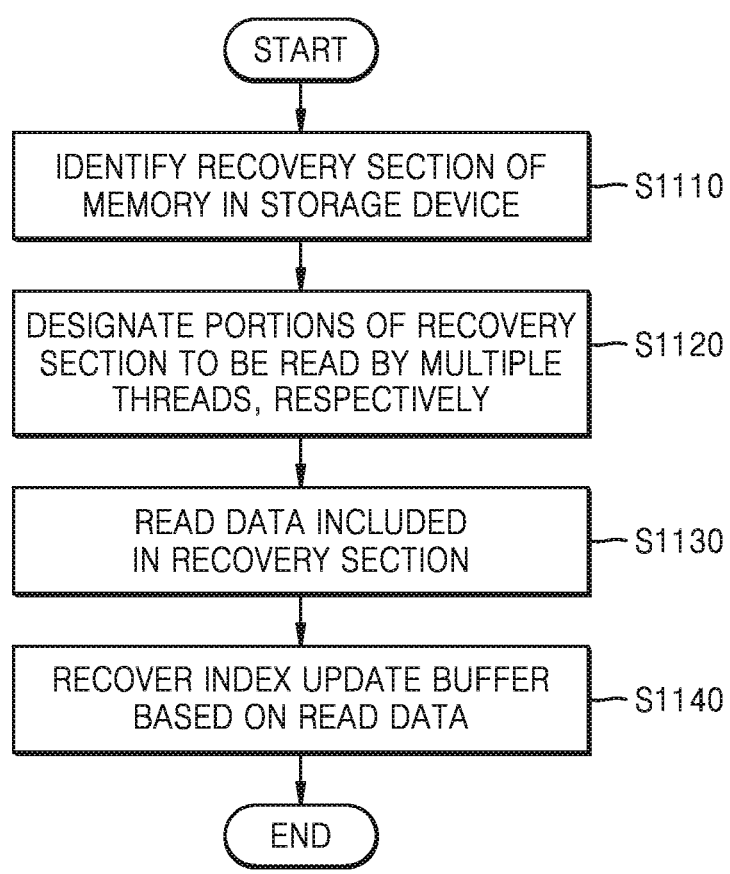
FIG. 11 is a flowchart of an operating method of a host according to an embodiment.

FIG. 11 is a flowchart of an operating method of a host according to an embodiment. The operating method of the host according to an embodiment is described with reference to the embodiment of FIG. 9.

FIG. 11 is a flowchart illustrating a method of performing, by the host 200, a recovery operation on the index update buffer 220. When the index update buffer 220 requires recovery, the host 200 may initiate operations of FIG. 11. For example, when the power of the host 200 is suddenly off or a malfunction of the memory 212 in the host 200 occurs, and atomicity or persistence of the index update buffer 220 is no longer secured, the host 200 may determine that the index update buffer 220 needs to be recovered.

In operation S1110, the host 200 may identify a recovery section of memory in the storage device 100. To this end, the host 200 may obtain a most recent commit order and a last commit order transferred to the index tree 210 from the header block H of the storage device 100. In the embodiment of FIG. 9, the host 200 may obtain the fifth commit COMMIT 5 as the most recent commit order, and obtain the first commit COMMIT 1 as the last commit order updated to the index tree 210.

The host 200 may identify as the recovery section a section corresponding to memory that stores data between the last commit order updated to the index tree 210 and the most recent commit order. In the embodiment of FIG. 9, the host 200 may identify as the recovery section a section between a data block after the first commit COMMIT 1 is performed and a data block before the fifth commit COMMIT 5 is performed.

In operation 51120, the host 200 may designate portions of the recovery section to be read by a plurality of threads, respectively. The threads may correspond to respective processing elements of processor 214 running read processes in parallel. To this end, the host 200 may identify a plurality of "commit sections" of the recovery section based on a commit order. For example, the host 200 may designate a plurality of commit sections of the recovery section so that data blocks having the same commit order are included in the same commit section. In the embodiment of FIG. 9, the host 200 may designate the commit sections so that data blocks having the versioning key CMT #2 DATA 1 and CMT #2 DATA 2 are included in a first commit section, data blocks having the versioning key CMT #3 DATA 1 and CMT #3 DATA 2 are included in a second commit section, data blocks having the versioning key CMT #4 DATA 1 and CMT #4 DATA 2 are included in a third commit section, and data blocks having the versioning key CMT #5 DATA 1, CMT #5 DATA 2, and CMT #5 DATA 3 are included in a fourth commit section.

The host 200 may distribute each of the plurality of commit sections to the plurality of threads. In the embodiment of FIG. 9, when the plurality of threads include a first thread, a second thread, a third thread, and a fourth thread, the host 200 may distribute the first commit section to the first thread, the second section to the second thread, the third commit section to the third thread, and the fourth commit section to the fourth thread.

In operation S1130, the host 200 may read data included in the recovery section.

In an embodiment, the host 200 may read data from the storage device 100 based on a commit order corresponding to a distributed commit section through each of the plurality of threads. In this regard, each of the plurality of threads may read data from the storage device 100 based on a commit order of data blocks included in the distributed commit section. In the embodiment of FIG. 9, since the commit order of the data blocks included in the first commit section, which is a distributed commit section of the first thread, is 2, the first thread may read all data having the commit order of 2 from the storage device 100. Moreover, since the commit order of the data blocks included in the fourth commit section, which is a distributed commit section of the fourth thread, is 5, the fourth thread may read all data having the commit order of 5 from the storage device 100.

Each of the plurality of threads may identify the number of data blocks included in the commit section, and read all data having the same commit order based thereon. In the embodiment of FIG. 9, as the number of data blocks included in the fourth commit section is 3, all of three data blocks having the commit order of 4 may be read.

In another embodiment, the host 200 may read from the storage device 100 data having a commit order including the same prefix through each of the plurality of threads. In this case, the host 200 may read data from the storage device 100 by using an iterator reading all data having a commit order including the same prefix.

When the host 200 reads data included in the recovery section through the plurality of threads, the host 200 may read data included in the recovery section from the storage device 100 in parallel through each of the plurality of threads. In other words, the plurality of threads may read data included in the distributed commit section at the same time point. In the embodiment of FIG. 9, when the first thread reads data included in the first commit section, the second thread may read data included in the second commit section, the third thread may read data included in the third commit section, and the fourth thread may read data included in the fourth commit section.

As such, by reading data in parallel through the plurality of threads, the speed of recovery of the index update buffer may be increased.

In operation S1140, the host 200 may recover the index update buffer based on the read data. To this end, the host 200 may insert at least a part of data read through the plurality of threads into the index update buffer 220 to recover the index update buffer 220.

The host 200 may select valid data among the read data and insert the valid data into the index update buffer 220. In an embodiment, the valid data may be data having a valid versioning key.

After the index update buffer 220 is recovered through operation S1140, the host 200 may delete data stored after the recent commit among the data stored in the storage device 100 (although this operation is not illustrated in FIG. 11). This may be described with reference to the embodiment of FIG. 10.

In the embodiment of FIG. 10, as the recent commit order is the third commit COMMIT 3 and the last commit order updated to the index tree 210 is the first commit COMMIT 1, the recovery section may be a section between a data block after the first commit COMMIT 1 is performed and a data block before the third commit COMMIT 3 is performed.

In this case, data blocks after the third commit COMMIT 3 is performed may not be recovered to the index update buffer 220. For example, the data blocks of which versioning key is CMT #4 DATA 1, CMT #4 DATA 2, or CMT #4 DATA 3 may not be recovered to the index update buffer 220.

The host 200 may delete, among the data stored in the storage device 100, data of which versioning key is CMT #4 DATA 1, CMT #4 DATA 2, or CMT #4 DATA 3, which is data stored after the recent commit.

The data blocks for which the versioning key is CMT #4 DATA 1, CMT #4 DATA 2, or CMT #4 DATA 3 may be blocks including data of which storage is not confirmed by the host 200 by a commit of the storage device 100. Accordingly, by deleting data stored after the recent commit among the data stored in the storage device 100, the host 200 may prevent possible issues, such as reuse of versioning key, etc.

By using the host 200 according to the inventive concept and the operating method of the host 200 described above, the index update buffer may be recovered more quickly by using a plurality of threads for recovery of the index update buffer 220.

Figure 12:
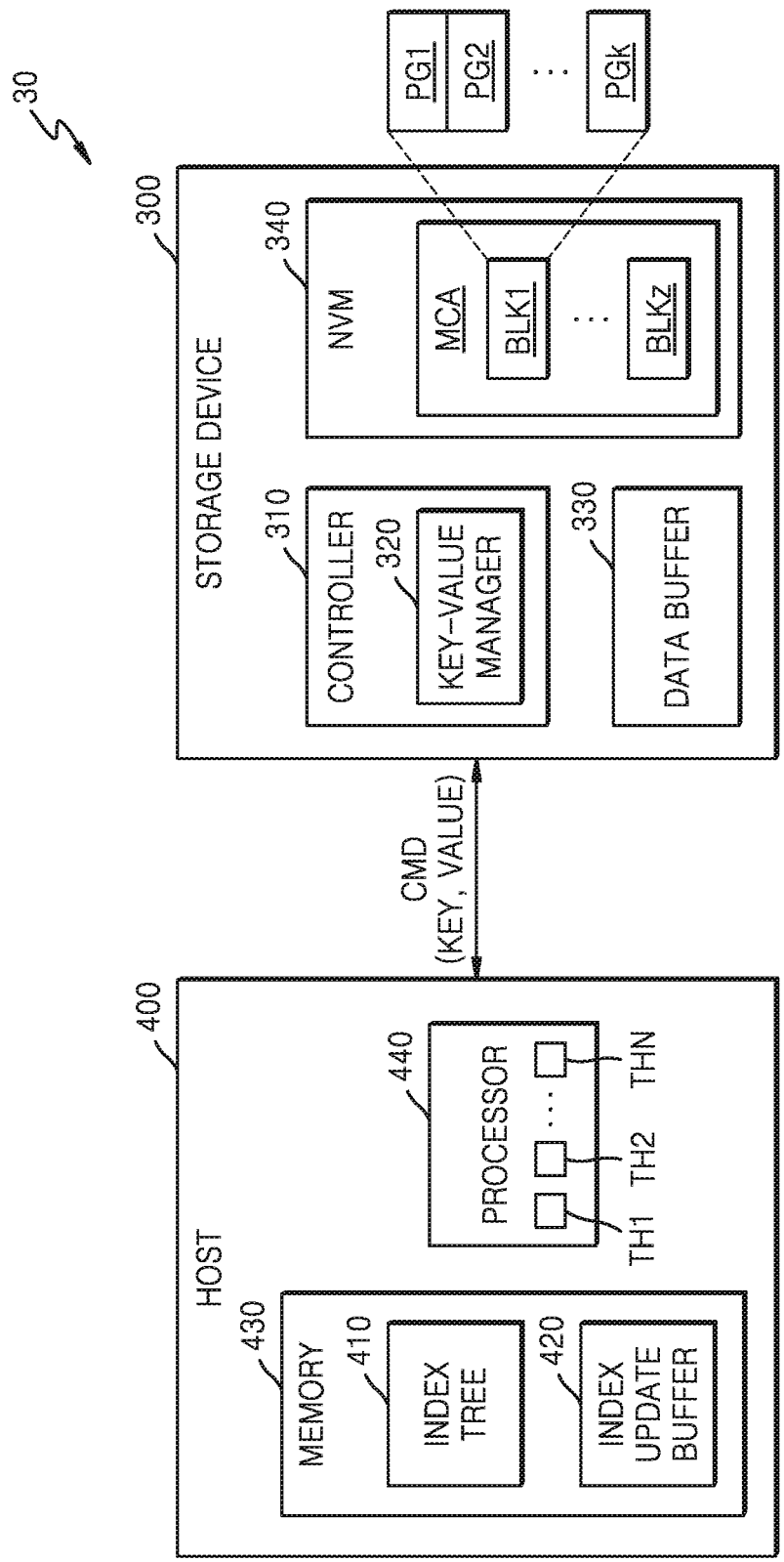
FIG. 12 is a diagram of a storage system according to an embodiment.

FIG. 12 is a diagram of a storage system according to an embodiment.

With reference to FIG. 12, a storage system 30 may include a storage device 300 and a host 400. The storage device 300 may include a controller 310, a data buffer 330, and an NVM 340. Since the embodiment of FIG. 12 performs operations substantially similar to those of the embodiment of FIG. 1, descriptions thereon are provided focusing on differences therebetween.

In the embodiment of FIG. 12, the host 400 may include a memory 430 and a processor 440. The processor 440 may run a program including a plurality N of threads TH1 to THN, where N may correspond to the number of commit sections as discussed above. In other words, the plurality of threads TH1 to THN may be run by different respective processing resources of the processor 440.

The memory 430 may store an index tree 410 and an index update buffer 420. The memory 430 may be implemented as volatile memory such as DRAM and SRAM. Accordingly, the index tree 410 and the index update buffer 420 may be erased from the memory 430 when the power of the host 400 is turned off. In this case, the index tree 410 may be stored in non-volatile memory within the storage device 300, and the index update buffer 420 may be updated to the index tree 410.

The processor 440 may include a central processing unit (CPU), a microprocessor, etc., and may control all operations of the host 400. The memory 430 may operate according to the control by the processor 440. That is, the processor 440 may perform all operations described with reference to FIGS. 3, 4, and 11, and all calculations required therefor.

Figure 13:
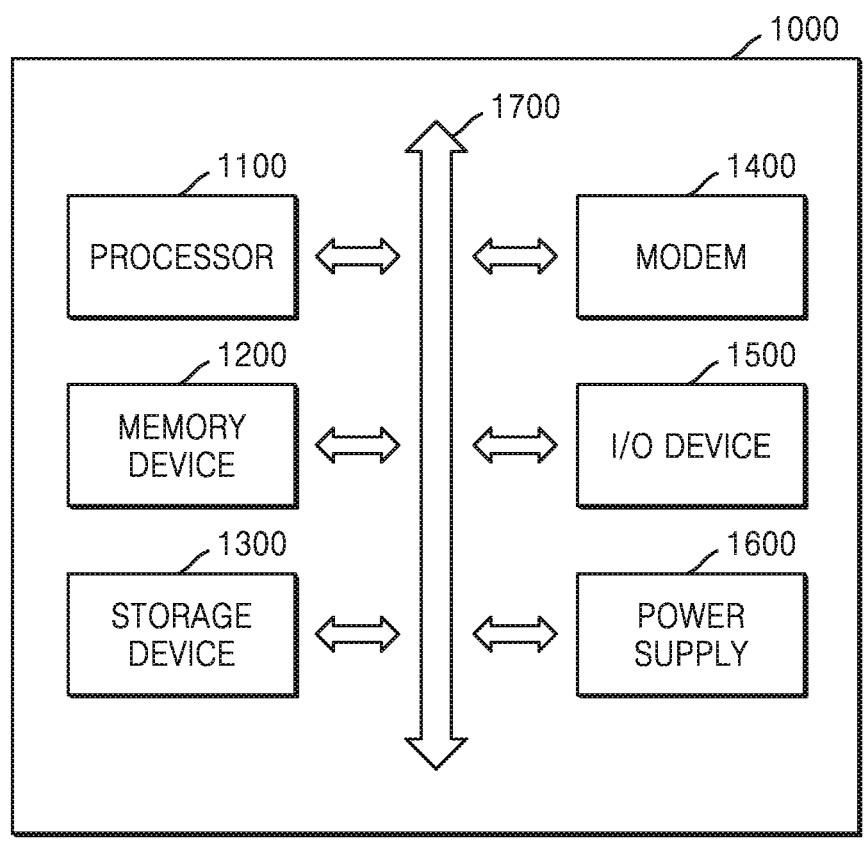
FIG. 13 is a block diagram of an electronic device according to an embodiment.

FIG. 13 is a block diagram of an electronic device according to an embodiment.

With reference to FIG. 13, an electronic device 1000 may include a processor 1100, a memory device 1200, a storage device 1300, a modem 1400, an input/output device 1500, and a power supply 1600. The processor 1100 and the memory device 1200 may be implemented similarly to the processor 440 and the memory 430 included in the host 400 of FIG. 12. The memory device 1200 may store an index tree and an index update buffer therein. The storage device 1300 may be implemented similarly to the storage device 100 of FIG. 1 and the storage device 300 of FIG. 12.

In an embodiment, when the index update buffer in the memory device 1200 requires recovery, the processor 1100 may identify a recovery section of memory in the storage device including data corresponding to a versioning key which has not been transferred to the index tree, designate portions of the recovery section to be read by a plurality of threads, respectively, read data included in the recovery section from the storage device 1300 through the plurality of threads in parallel, and insert at least a part of the read data into the index update buffer 220 to recover the index update buffer 220. As such, by recovering the index update buffer 220 by using the plurality of threads, the index update buffer 220 may be recovered more quickly.

While the inventive concept has been particularly shown and described with reference to embodiments thereof, it will be understood that various changes in form and details may be made therein without departing from the spirit and scope of the following claims.

What is claimed is:

1. A host for communicating with a storage device that stores data in key-value pairs, the host comprising:
a processor;
a memory including:
an index tree that stores an index including a versioning key used to read data stored in the storage device; and
an index update buffer that stores a write key included in data subject to a write request and the versioning key corresponding to the write key,
wherein the processor is configured to:
when a preset update condition is satisfied, update the index tree by transferring the versioning key stored in the index update buffer to the index tree, and
when the index update buffer requires recovery, identify a recovery section of memory in the storage device including data corresponding to the versioning key which has not been transferred to the index tree, designate portions of the recovery section to be read by a plurality of threads, read data included in the recovery section from the storage device through the plurality of threads, and insert the read data into the index update buffer to recover the index update buffer.

2. The host of claim 1, wherein, when receiving the write request, the host generates the versioning key corresponding to the write key, based on a commit order of the storage device and a data order in a commit, and stores the versioning key in the storage device and the index update buffer.

3. The host of claim 2, wherein, when the preset update condition is satisfied, the host transfers the versioning key stored in the index update buffer to the index tree.

4. The host of claim 3, wherein the update condition includes at least one of a commit number of the storage device being higher than a predetermined number, a preset reference time has passed, and a command to shut off power of the host has been received.

5. The host of claim 1, wherein the host obtains a most recent commit order and a last commit order transferred to the index tree from a header block and identifies as the recovery section a section between the most recent commit order and the last commit order updated to the index tree.

6. The host of claim 1, wherein the host designates a plurality of commit sections of the recovery section as the portions to be read, based on a commit order, and distributes data of the plurality of commit sections to the plurality of threads.

7. The host of claim 6, wherein the host reads data from the storage device, based on a commit order corresponding to each of the designated commit sections through each of the plurality of threads.

8. The host of claim 1, wherein the host reads from the storage device data having a commit order including a same prefix through each of the plurality of threads.

9. The host of claim 1, wherein the host reads data included in the recovery section from the storage device in parallel through each of the plurality of threads.

10. The host of claim 1, wherein the host selects valid data among the read data and inserts the valid data into the index update buffer to recover the index update buffer.

11. The host of claim 1, wherein, after recovering the index update buffer, the host deletes data stored after a most recent commit among data stored in the storage device.

12. An operating method of a host communicating with a storage device that stores data in key-value pairs, the operating method comprising:

identifying, by the host, a recovery section of memory of the storage device including data corresponding to a versioning key which has not been updated to an index tree;

designating, by the host, portions of the recovery section to be read by a plurality of threads;

reading, by the host, data included in the recovery section from the storage device through the plurality of threads; and inserting, by the host, the read data into an index update buffer to recover the index update buffer, wherein the index tree stores an index including information for identifying a key used to read data stored in the storage device, and the index update buffer stores a write key included in data subject to a write request and the versioning key corresponding to the write key.

13. The operating method of claim 12, wherein the identifying of the recovery section includes:

obtaining, by the host, a most recent commit order and a last commit order updated to the index tree, from a header block of the storage device; and setting, by the host, a section between the most recent commit order and the last commit order transferred to the index tree, as the recovery section.

14. The operating method of claim 12, comprising designating a plurality of commit sections as the portions of the recovery section to be read, based on a commit order; and reading, by the host, each of the plurality of commit sections in parallel using the plurality of threads.

15. The operating method of claim 14, wherein reading of the data included in the recovery section includes reading, by the host, data from the storage device based on a commit order corresponding to each of the commit sections distributed through each of the plurality of threads.

16. The operating method of claim 12, wherein the reading of the data included in the recovery section includes reading, by the host, data having a commit order including a same prefix from the storage device through each of the plurality of threads.

17. The operating method of claim 12, wherein the recovering of the index update buffer includes:

selecting, by the host, valid data from the read data; and recovering, by the host, the index update buffer by inserting the valid data into the index update buffer.

18. The operating method of claim 12, further comprising, after recovering the index update buffer, deleting, by the host, data stored after a recent commit among the data stored in the storage device.

19. A storage system comprising:

a storage device configured to store data in key-value pairs; and a host including a memory and a processor, wherein the memory stores an index tree storing an index including information for identifying a versioning key used to read data stored in the storage device, and an index update buffer storing a write key included in data subject to a write request and the versioning key corresponding to the write key, and wherein, when a preset update condition is satisfied, the processor transfers the versioning key stored in the index update buffer to the index tree, and when the index update buffer requires recovery, the processor identifies a recovery section of memory in the storage device including data corresponding to the versioning key which has not been transferred to the index tree, designates portions of the recovery section to be read by a plurality of threads, reads data included in the recovery section from the storage device through the plurality of threads, and inserts the read data into the index update buffer to recover the index update buffer.

20. The storage system of claim 19, wherein the processor is configured to designate a plurality of commit sections of the recovery section as the portions to be read, based on a commit order, and read data of the plurality of commit sections in parallel by the plurality of threads, respectively.

* * * * *